(12) United States Patent
Peled et al.

(10) Patent No.: US 7,951,511 B2
(45) Date of Patent: May 31, 2011

(54) FUEL CELL WITH PROTON CONDUCTING MEMBRANE AND WITH IMPROVED WATER AND FUEL MANAGEMENT

(75) Inventors: Emanuel Peled, Even Yehuda (IL); Tair Duvdevani, Ramat Gan (IL); Arnon Blum, D. N. Shikmim (IL); Vladimir Livshits, Netanya (IL); Adi Aharon, Herzliya (IL)

(73) Assignee: Tel-Aviv University Future Technology Development L.P., Tel-Aviv (IL)

( * ) Notice: Subject to any disclaimer, the term of this patent is extended or adjusted under 35 U.S.C. 154(b) by 0 days.

(21) Appl. No.: 12/764,396

(22) Filed: Apr. 21, 2010

(65) Prior Publication Data

US 2010/0255873 A1    Oct. 7, 2010

Related U.S. Application Data

(62) Division of application No. 10/483,340, filed as application No. PCT/IL02/00596 on Jul. 18, 2002, now Pat. No. 7,727,663.

(60) Provisional application No. 60/305,865, filed on Jul. 18, 2001, provisional application No. 60/305,866, filed on Jul. 18, 2001.

(51) Int. Cl.
*H01M 4/94* (2006.01)
*H01M 8/10* (2006.01)

(52) U.S. Cl. .......................... 429/534; 429/480

(58) Field of Classification Search .................. None
See application file for complete search history.

(56) References Cited

U.S. PATENT DOCUMENTS

| | | | |
|---|---|---|---|
| 3,650,836 A | 3/1972 | Grubb et al. | |
| 4,104,197 A * | 8/1978 | Heffler | 502/101 |
| 4,562,123 A | 12/1985 | Shimizu et al. | |
| 4,612,261 A | 9/1986 | Tsukui et al. | |
| 5,182,947 A | 2/1993 | Fidelak et al. | |
| 5,599,638 A | 2/1997 | Surampudi et al. | |
| 5,777,162 A | 7/1998 | Matthews et al. | |
| 5,783,325 A * | 7/1998 | Cabasso et al. | 429/524 |
| 5,834,136 A | 11/1998 | Gao et al. | |
| 5,840,438 A | 11/1998 | Johnson et al. | |
| 5,904,740 A | 5/1999 | Davis | |
| 6,080,503 A | 6/2000 | Schmid et al. | |
| 6,447,909 B1 | 9/2002 | Kato et al. | |
| 6,475,656 B1 | 11/2002 | Koschany et al. | |
| 6,492,052 B2 | 12/2002 | Ren | |
| 7,029,775 B2 | 4/2006 | Horiguchi et al. | |

(Continued)

FOREIGN PATENT DOCUMENTS

AT       393 045 B    7/1991

(Continued)

*Primary Examiner* — John S Maples
(74) *Attorney, Agent, or Firm* — The Nath Law Group; Susanne M. Hopkins; Ari G. Zytcer

(57) ABSTRACT

The present invention provides a cathode and a fuel cell, which are built to prevent escape of liquids, e.g. water and fuel solution, from the cell. Thus, according to a first aspect thereof, the present invention provides a cathode suitable for use in a fuel cell having a proton conducting membrane, the cathode comprising a plurality of layers including a catalyst layer and a hydrophobic porous support layer, wherein at least one of said plurality of layers is a liquid water leak-proof layer, which allows gas to pass through it and prevents passage of liquid water and/or aqueous fuel solution.

9 Claims, 4 Drawing Sheets

U.S. PATENT DOCUMENTS

2002/0090082 A1    7/2002  McLean

FOREIGN PATENT DOCUMENTS

| | | |
|---|---|---|
| CN | 1201554 A | 12/1998 |
| CN | 1251212 A | 4/2000 |
| DE | 40 36 262 A1 | 9/1991 |
| DE | 43 29 571 A1 | 3/1994 |
| DE | 197 04 683 A1 | 8/1998 |
| DE | 197 03 214 C1 | 11/1998 |
| EP | 0 785 225 A2 | 7/1997 |
| EP | 1 091 437 B1 | 4/2001 |
| EP | 1 098 388 A1 | 5/2001 |
| GB | 2 364 613 A | 1/2002 |
| JP | 58-34574 A | 3/1983 |
| JP | 63-152880 A | 6/1988 |
| JP | 8-153527 A | 6/1996 |
| JP | 10-513006 A | 12/1998 |
| JP | 11-242962 A | 9/1999 |
| JP | 11-511289 T | 9/1999 |
| JP | 2000-12059 A | 1/2000 |
| JP | 2000-268835 A | 9/2000 |
| JP | 2000-348753 A | 12/2000 |
| JP | 2001-93558 A | 4/2001 |
| JP | 2001-102059 A | 4/2001 |
| JP | 2001-509304 T | 7/2001 |
| JP | 2007-149694 A | 6/2007 |
| WO | 95/31048 A1 | 11/1995 |
| WO | 97/08766 A2 | 3/1997 |
| WO | 97/13287 A2 | 4/1997 |
| WO | 98/33225 A1 | 7/1998 |
| WO | 99/40237 A1 | 8/1999 |
| WO | 99/44245 A1 | 9/1999 |
| WO | 00/52779 A1 | 9/2000 |
| WO | 01/54216 A2 | 7/2001 |

\* cited by examiner

FUEL CELL WITH PROTON CONDUCTING MEMBRANE AND WITH IMPROVED WATER AND FUEL MANAGEMENT

This application is a divisional of U.S. Ser. No. 10/483,340, filed 2 Jun. 2004, now U.S. Pat. No. 7,727,663, and is a national stage entry of PCT/IL02/00596, filed 18 Jul. 2002, which claims priority from Provisional Application No. 60/305,865 filed 18 Jul. 2001 and Provisional Application No. 60/305,866, filed 18 Jul. 2001.

FIELD OF THE INVENTION

This invention relates generally to fuel cells, and more particularly to a fuel cell having a solid, proton-conducting membrane.

BACKGROUND OF THE INVENTION

A fuel cell is an electrochemical device wherein hydrogen or an organic fuel is reacted with oxygen to generate electricity and to produce water. The reactants fed into a fuel cell need not be pure, for the oxygen can be taken from the is atmosphere and the hydrogen extracted from natural or synthetic fuels. The basic fuel process is efficient and pollution-free. However, since a single fuel cell yields an output of less than one volt, in order to provide a useful output it is necessary to connect a group of cells in series in a stack or in a flat formation, to create a power pack.

As a converter of energy, a fuel cell differs from a conventional voltaic cell or battery in which anode and cathode electrodes cooperate with an electrolyte, in that in a fuel cell the electrodes are invariable and catalytically active. Current is generated in a fuel cell by reactions on the electrode surfaces in contact with the electrolyte. These reactions involve (i) oxidation of hydrogen or organic fuel on an anode functioning as the negative electrode, as in a galvanic cell, giving rise to hydrated protons with the release of electrons, and (ii) reduction of oxygen on the cathode and producing water as electrons are consumed.

The first practical fuel cell was developed by General Electric (GE) for NASA in connection with the Gemini program. Included in this cell was an electrolyte in the form of a solid polymeric membrane, referred to as an "ionic-exchange membrane". The GE membrane was composed of a lace-like organic structure with an ionic group bonded firmly thereto, and hydrogen ions loosely held in the polymer chain to provide sufficient mobility for ionic support.

Fuel cells having polymeric membranes are disclosed in U.S. Pat. Nos. 5,599,638 and 5,777,162. Commonly used, as a membrane material having proton-exchange properties is Nafion™, manufactured by DuPont. When methanol serves as the fuel, electro-oxidation of methanol takes place at the anode, while electro-reduction of oxygen then occurs at the cathode to yield water. Protons generated at the anode are transported directly across the membrane to the cathode. The flow of current is sustained by ions flowing through the cell and by electrons passing through an external load.

A solid proton-conductive membrane (PCM) of the type included in a fuel cell in accordance with the invention, is disclosed in PCT Publication WO 99/44245 in the name of the same Applicant. Used in this membrane are polymeric binders selected from a group that includes polyvinylidenedifluoride (PVDF) polytetrafluoroethylene and polymethylmethacrylate. Inorganic powders for preparing this membrane include $SiO_2$, $ZrO_2$, $TiO_2$, $Al_2O_3$ and $B_2O_3$.

Also of prior art interest is the fuel cell disclosed in PCT publication WO 01/54216, in the name of the same Applicant. This cell includes an anode chamber to which fuel is supplied, and a cathode chamber to which oxygen is supplied. Interposed between the chambers is a solid electrolyte in the form of a proton-conducting membrane having fine pores whose diameter is smaller than 30 nm.

In hydrogen and in direct oxidation fuel cells (DOFC) liquid water tends to leak through the cathode. This water may include fuel, resulting in a loss of fuel as well as water. Liquid water leakage through the cathode of a fuel cell having a solid electrolyte membrane such as Nafion™ can be serious, since the osmotic drag of water is about three water molecules per proton, or eighteen water molecules for each methanol molecule. This (if all the water exits the cathode) gives rise to a loss of up to 10 g of water per one gram of methanol consumed in the cell reaction. And the osmotic drag of water by the protons may cause a build-up of hydraulic pressure at the catalyst layer of this cathode. This acts to increase leakage of liquid water or aqueous fuel solution through holes or cracks in the gas diffusion layer (GDL) of the cathode, as well as through the edge or periphery of the membrane and through the gap between the cathode-solid membrane-anode assembly (also termed in the art "membrane electrode assembly" or MEA) and the circular gasket of the cell.

SUMMARY OF THE INVENTION

In view of the foregoing, there is a need in the art to provide a novel efficient fuel cell with improved water and fuel management. Thus, the present invention provides an improved fuel cell that utilizes a proton conducting membrane sandwiched between an anode layer and a cathode layer and includes a system which prevents or substantially reduces the water leak from the cell. The present invention also provides means in a fuel cell having a system which prevents or substantially reduces the water leak from the cell, that release hydraulic pressure which builds up at the cathode in the course of operation.

Briefly stated the above features are attained by a cathode and a fuel cell according to the invention, which is built to prevent escape of liquids, e.g. water and fuel solution, from the cell. The fuel cell of the invention comprises a plurality of superposed layers, where a proton-conducting membrane functions as a solid electrolyte and is sandwiched between an anode layer and a cathode layer which is water leak-proof. Hydrogen or an organic fuel is fed into the cell to react with the anode layer, and oxygen-containing air is fed into the cell to react with the cathode layer.

According to the invention, the loss of liquids, e.g. water and aqueous fuel solution from the cell are prevented or substantially reduced by the following means:

i) A sealant material such as glue or a sealant cement between the edges of the membrane-electrode assembly (MEA) and the gasket surrounding it;

ii) A sealant material sealing the proton conducting membrane edges; and iii) A liquid-water leak-proof layer, located at any place between the PCM and the cathode current collector. Such a liquid-water leak-proof layer is hydrophobic and has pores that are large enough to allow air or oxygen transport through it to the catalyst layer and small enough to prevent transport of liquid from the cathode side outside the fuel cell. Typically, these conditions require that the pores will be larger than 0.001 microns, preferably larger then 0.01 micron and smaller than 5 microns, preferably smaller than 0.5 microns.

Thus, according to a first aspect thereof, the present invention provides a cathode suitable for use in a fuel cell having a proton conducting membrane, the cathode comprising a plurality of layers including a catalyst layer and a hydrophobic porous support layer, wherein at least one of said plurality of layers is a liquid-water leak-proof layer, which allows gas to pass through it and prevents passage of liquid water and/or aqueous fuel solution.

According to one embodiment of the present invention, the catalyst layer is the layer that functions as the liquid-water leak-proof layer. According to another embodiments, the leak-proof layer is embedded in the hydrophobic porous support layer or is directly applied on the catalyst layer between the PCM and the catalyst layer of the cathode.

The present invention further provides an assembly built of an anode, a solid electrolyte membrane and a liquid-water leak-proof cathode as described above. Such an assembly is termed hereinafter "membrane electrode assembly" (MEA). The solid electrolyte membrane will be generally termed proton conducting membrane (PCM), and this term is used to encompass both proton exchange membranes such as Nafion™ and proton conducting membranes such as those described in WO 01/54216.

According to the present invention, escape of liquid water and fuel solution through the peripheric side surfaces (i.e. edges) of the MEA are prevented or substantially reduced by sealing the edges of the MEA with a sealant material that is capable of preventing the passage through it of water and/or aqueous fuel solution. Non-limiting examples of such sealant material are glue and sealing cement.

Preferably, the sealing is located between the cathode edges and the proton conducting membrane, as well as on the edges of the proton conducting membrane.

Fuel cell or fuel cell arrangements comprising the cathode or the MEA of the invention are also within the scope of the present invention. A specific example of a fuel cell that may utilize the cathode of the invention is a direct oxidation fuel cell (DOFC). Preferable fuels are those that undergo over 80% conversion to $CO_2$, and leave only negligible amounts of nonvolatile side products when used as fuels in a fuel cell. Examples of such fuels are hydrogen, methanol, dimethyl oxalate, ethylene glycol and oligomers and polymers of ethylene glycol.

The fuels may optionally comprise between about 0.1% to 10w/w percents of additives, which increase the viscosity of the fuel solution. These additives are preferably inert polymeric materials, which do not interfere with the operation of the cell, but minimize the leak of fuel solution through the seals of the DOFC and through the MEA, since they increases the solution viscosity up to the formation of a gel. Examples of such additives are polyacrylates such as polyacrylic acid and alkali metal salts of polyacrylic acid.

The fuel cell of the invention comprises two supporting plates having sandwiched between them a stack of superposed layers, a gasket surrounding the cathode and a sealant material sealing any gap between the gasket and at least one of the layers in the stack.

Because a fuel cell having a leak-proof cathode according to the invention experiences no substantial loss of water, it may happen that water returns from the cathode to the aqueous fuel solution tank, so that no room is left for additional fuel. This situation is more frequent with cells using hydrophilic proton conducting membranes, such as those described in WO 01/54216, and less frequent with cells using hydrophobic proton conductive membranes such as the commercially available Nafion™. Therefore, according to yet another embodiment of the present invention, the fuel cell of the invention is equipped with means for controlling the evaporation of water from the cell. Such means may encourage evaporation of water from the cell and thus reduce the amount of water that returns to the fuel solution tank. A fuel cell of the invention may be further equipped with means to prevent hydraulic pressure built-up on the cathode in the course of operation of the cell. Such means may be particularly useful in fuel cells where a hydrophobic proton conducting membrane is used. Typically, such means will include water collectors, to collect water and solution that accumulates on the cathode. The water collectors may be connected to an exhaust duct that lets the water flowing out of the cell. The water may be then directed to the environment or back into the fuel solution tank, as required according to the liquid level in the fuel solution tank. The water collectors may be, for example, a set of hydrophilic channels pressed onto the cathode face, where the water is expected to accumulate, or a set of hydrophilic fibers, such as cotton fibers, placed where the water are expected to accumulate.

The evaporation of water from the cell may be achieved by forcing a stream of air onto the external side of the cathode. This may be done, for example, by a blower or a compressor. In one embodiment, air is compressed through the oxygen flow channel of the cell in a flux that suffices not only to feeding the reaction with oxygen, but also for encouraging evaporation from the cell. In case of using a blower, the blower may preferably be powered by electricity generated by the fuel cell.

Evaporation of water from the fuel cell may be reduced, when required, by reducing the portion of the cathode surface area through which vapor may evaporate. An arrangement for controlling the portion of the cathode surface area through which vapor may evaporate is built according to one embodiment of the invention as a barrier with holes of variable size. According to a non-limiting example such a barrier is constructed of a fixed perforated layer and a sliding perforated layer, wherein the portion of the cathode area through which vapor may evaporate is determined by the position of the sliding perforated layer in respect of the fixed perforated layer. Each of the perforated layers has between 0.5 to 10 holes per $cm^2$ and the pores cover between 0.2 to 70% of the cathode area, more preferably between 2 to 30% of the cathode area in close and open position, respectively.

According to another embodiment of the present invention, there is provided a hybrid power source comprising at least one fuel cell according to the invention, a DC-to-DC converter and a rechargeable battery. The fuel cell charges the battery and supplies the low power demand while the high power battery supplies the heavy loads. In such a hybrid power source it is possible to combine as few as two or three fuel cells (in a series combination) through a DC-to-DC converter to a battery and the obtained device is flat and thin. For example, to power a cellular phone it is possible to use a hybrid power source built of two thin methanol fuel cells, connected in a series combination, a DC-to-DC converter and a small high power lithium ion cell.

According to another aspect, the present invention provides a detector device capable of detecting whether there is a required amount of liquid in an appliance or not, while the orientation of the appliance in space is not fixed, e.g. portable devices. It should be understood that such an appliance (container) is a closed structure for containing a liquid medium, for example for supplying the liquid medium into another device to enable its operation. Considering a fuel cell application, such a container is a reservoir of at least one of the following: water, fuel, fuel solution and acid, and is used to supply this medium to the fuel cell. In the description below, this medium container is termed "fuel tank" or "fuel solution tank", but it should be understood that the use of this term does not limit the invention to this specific example of medium and appliance.

The detector comprises an electrodes' arrangement (preferably composed of at least four electrodes) with the electrodes being arranged in a spaced-apart relationship in the container so as to be in contact with the inside space of the container, and be spaced from or be in physical contact with the inner surface of the fuel solution tank, such that they are capable of detecting the existence of liquid inside the tank in a number of planes (levels) defined by the number of electrodes, namely, the number of pairs of electrodes. For example, using four electrodes, six pairs of electrodes are provided defining six different planes (levels) in the tank. The electrodes are preferably located closer to the periphery region of the tank than to the center region thereof. For example, the tank may be shaped like a box, and each of the electrodes (preferably, at least four electrodes) is placed on or closer to a different side of the tank. Hence, at each orientation of the tank, a predetermined quantity of liquid in the tank will suffice to at least partly cover at least two of the electrodes. By applying voltage to the electrodes pair, the detection of whether at least one of these electrodes is in contact with the liquid medium in the tank or not, thereby detecting the existence of the liquid at the plane (level) defined by this electrodes pair. When the liquid level in the tank is smaller than said predetermined quantity (defined by certain threshold value), the device would detect lack of liquid.

According to another aspect of the present invention there is provided a fuel cell system of the non-stack type in which neighboring cells in the system have a common wall or where their fuel tanks have a common wall, to equilibrate the concentration of the volatile fuel in the system.

According to a further aspect, the present invention provides a cellular phone comprising an antenna, an earphone, a fuel cell, a fuel tank and a water tank, wherein at least one of the fuel cell, fuel tank and water tank is located between said antenna and said earphone so that at least part of the radiation irradiated from the antenna is absorbed by said fuel cell, fuel tank and/or water tank.

BRIEF DESCRIPTION OF THE DRAWINGS

In order to better understand the invention and to see how it may be carried out in practice, some specific embodiments will now be described, by way of non-limiting examples only, with reference to the accompanying drawings, in which.

DETAILED DESCRIPTION OF THE INVENTION

Water Leak-Proof Cathode Structure

Figure 1A:
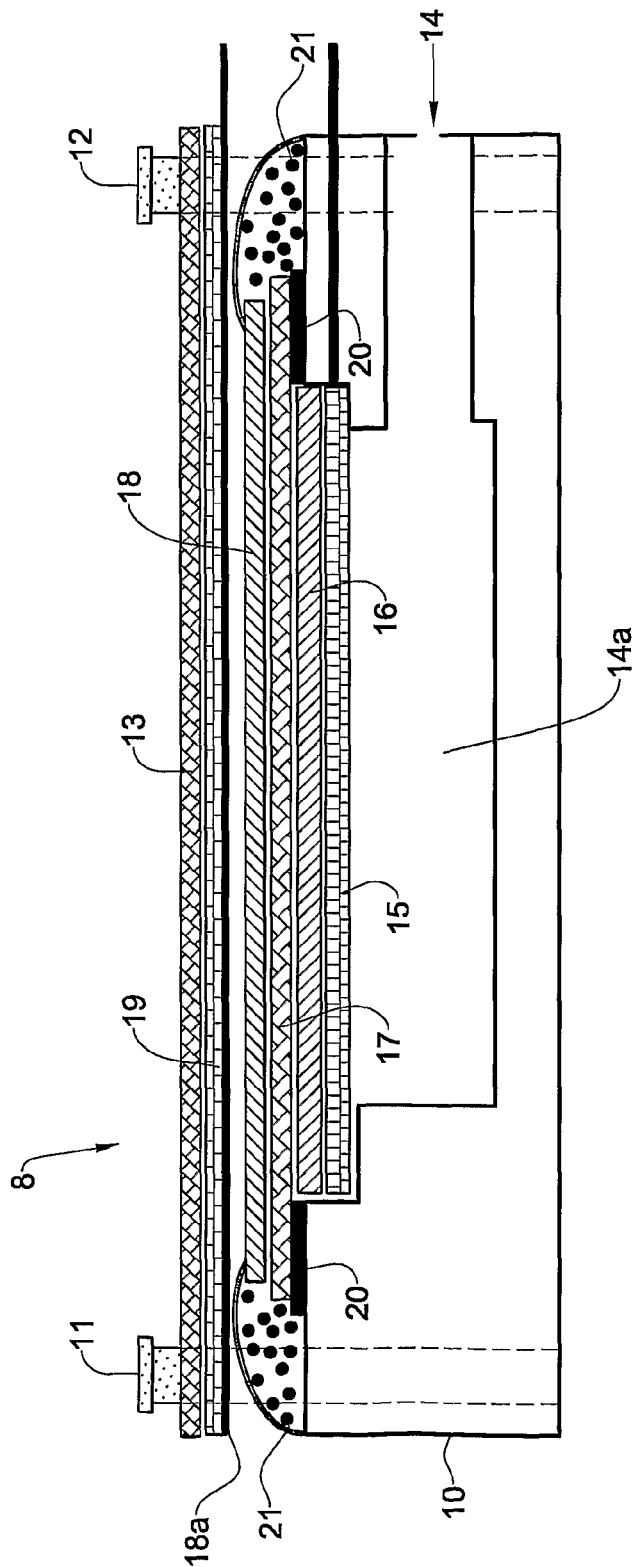
FIG. 1A schematically illustrates a fuel cell in accordance with one embodiment of the present invention.

FIG. 1A schematically illustrates a fuel cell 8 according to one embodiment of the present invention. The fuel cell 8 has a liquid-water leak-proof cathode structure in accordance with the invention. The cell is created by a stack of a plurality of layers fastened onto the face of a plastic case 10 by a pair of threaded bolts 11 and 12 received in diametrically-opposed bores in case 10. In the stack, the uppermost filter layer 13 which is on the cathodic-side current collector of the cell, functions as an air and humidity control layer. Fed into the cell on its anode side via an inlet 14 in case 10 is organic fuel, aqueous fuel solution or hydrogen, which reacts with oxygen to generate electricity and to produce water and $CO_2$ in the case of direct oxidation of an organic fuel.

Inlet 14 conducts incoming fuel into the fuel tank 14$a$ to the lowermost layer 15 in the stack of layers which functions as an anode current-collector. Layer 15 underlies an anode layer 16, directly above of which is a proton-conducting membrane 17 (PCM). Overlying membrane 17 is a cathode layer 18 and cathode current collector 18$a$. Hence, the proton-conducting membrane 17 is sandwiched between the anode and the cathode of the fuel cell. The cathode layer 18 includes a catalyst, a liquid-water leak-proof layer and a hydrophobic porous carbon support layer. Above the cathode current collector 18$a$ is a porous hydrophobic barrier film 19 which lies under the air filter layer 13. Any gap between the PCM 17 and the case 10 is sealed by a layer of glue (20). Also shown is a glue layer 21, preventing water leakage from any place between the cathode 18 and the case 10. The gap between layers 18 and 18$a$ seems in the figure to be larger than the gap between other layers in the stack because of the need to show the glue layer 21. In practice, however, all layers (including 18 and 18$a$) are pressed together without any visible spacing between them.

Figure 1B:
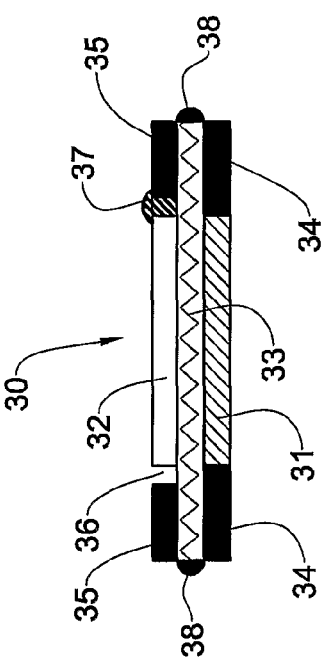
FIG. 1B schematically illustrates a cross section of another embodiment of the fuel cell according to the present invention.

FIG. 1B describes a fuel cell 30 having another layer structure, typical to a single cell which is part of a multi cell stack, wherein cells are stacked in series. The cell 30 includes an anode (31), a proton conducting membrane (33), a liquid-water leak-proof cathode according to the present invention (32), a gasket for the anode side (34) and a gasket for the cathode side (35). The fuel cell 30 also includes a seal 37 (showed schematically only on one side but practically existing on all the gap between the cathode and the gasket), sealing a gap 36 between the cathode edges and the gasket 35 and a seal 38 sealing the edges of the proton conducting membrane 33. The invention is not limited by sealing the above mentioned places, and each place in the cell from where water is observed to be leaking should be sealed similarly. The combination of the above seals with to liquid-water leak-proof cathode resulted in a decrease of more than 20% in the crossover current of a 7 cm$^2$ DMFC and therefore plays an important role in the efficiency of the fuel cell.

Preferred sealant materials for the sealing according to the present invention are PVDF, poly-acrylic glue, tar-based cement and silicon-rubber cement all of which are impermeable to liquid water. However, other sealant materials compatible with the fuel solution and oxygen may also be used.

By using a liquid-water leak-proof cathode and by sealing the gap between such cathode and the gasket surrounding it according to this invention, it is possible not only to reduce water loss due to proton osmotic drag to zero, but even to reverse the direction of water flow to form a net flow of water from the cathode to the anode through the membrane, according to the pressure developed in the cathode during the operation of the fuel cell. This is of special importance for small DOFCs in portable applications.

Liquid-water leak-proof layers and their application within the present invention will now be explained with reference to commercial cathodes such as Etek Elite, where a gas diffusing layer (GDL) contains cracks and holes up to 25 microns in width or in diameter. Liquid water leaks through these cracks to the outer side (air side) of the cathode. This leak is eliminated or significantly reduced by means of a liquid-water leak-proof layer consisting of a hydrophobic layer virtually free of holes and cracks larger than 5 microns, but still having pores larger than 0.001 microns to allow air or oxygen transport to the catalyst layer. Preferred dimensions of the pores in the leak-proof layer are between 0.01 and 0.5 microns.

The liquid-water leak-proof layer according to the present invention may be anywhere between the PCM and the air-side of the cathode.

In some cases, the catalyst layer is a liquid-water leak-proof layer. In such cases it typically has a thickness of 10 to 100 microns and is free of cracks or holes larger than 3 microns and it is applied directly on the membrane between the membrane and the porous support layer of the cathode.

Alternatively, a Nafion layer of similar structure is located directly on the cathode catalyst layer between the PCM and the catalyst layer to serve as a liquid-water leak-proof layer.

It should be noted that some cracks and holes may have length, width and depth of mutually different dimensions. According to the invention, the combination of these should be such that will not allow passage of liquid water (and/or fuel solution) through the wholes and cracks. The given dimensions (of between 0.001 to 5 microns, preferably between 0.01 to 0.5 microns) are given to illustrate the preferable diameter of a circular pore.

The same liquid water leak takes place when using a proton conducting membrane in hydrogen fuel cell. The same means are useable in this case to minimize or block the leak of liquid water through the cathode.

Preparation of Liquid-Water Leak-Poof Cathode and of a Complete Fuel Cell:

Membrane electrode assemblies (MEAs) were prepared, as described in WO 01/54216. The material for the liquid-water leak-proof layer is a paste that consists of 10-50% w/w PVDF or Teflon, or may consist of fluoro-polymers and per-fluoro-polymers (preferably 20-40%), 50-90% w/w, (preferably 60-80% w/w) carbon powders such as: Black Pearl 2000, XC 72, Shawingan black, and various mixtures thereof, and 0-80% v/v (preferably 60% v/v) of pore-former such as propylene carbonate (PC) or ethylene glycol (EG).

Using a plastic knife or soft paper, the paste is inserted into the pores of the Toray paper (5%-50% w/w wet proofed, preferably 20%) to form a layer inside the Toray paper, close to its surface. Several such paste insertions are made. Each layer is left to dry for about 30 min and then wiped with a dry and clean cloth paper. Up to 5-7 layers of leak-proof material are needed in order to receive a uniform coating of 5 to 50 microns thick. After a satisfactory morphology is reached, the Toray paper with the leak-proof material is immersed into distilled water for about 2 minutes, followed by curing at 150 to 250° C. for 0.5 to 2 hours.

The Toray carbon paper with the embedded liquid-water leak-proof material, having pores size of 0.5 to 0.01 microns on which there is a catalyst layer was hot pressed to the PCM.

Alternatively, a thick hydrophobic cathode catalyst layer may serve as a liquid-water leek-proof layer when it consists of holes smaller than 3 microns and larger than 0.001 microns.

The sealing of the cathode edges was done as follows. A PVDF paste made by mixing 1-3 gr. of PVDF (SOLVEY) with 20-40 ml. of acetone with a magnetic stirrer for 2-4 hrs, was applied on the gap (interface) between the membrane and the cathode, overlapping 1-2 mm of the (carbon paper) cathode with an extra fine brush making a thin film 0.05-0.1 mm thick. The same paste was applied on the outside edge of the membrane by dipping the membrane edge in the PVDF paste. In this way, a complete sealing was effected of the periphery of the cathode and the membrane edges, so that water leak outside the cathode is prevented or substantially reduced.

Several types of cells can be assembled with this water leak-proof cathode. A flat plastic case fuel cell was assembled in the following way: First the anode current collector (15 in FIG. 1A) was placed in its position in the plastic case (10 in FIG. 1A). A layer of glue (20 in FIG. 1A) was applied in its position and was left to dry for 15-30 min. The MEA (whose edges were sealed as described above) was placed on the anode current collector and was pressed onto the anode current collector. A sealing cement (21 in FIG. 1A) was applied to form a gasket area overlapping 1-2 mm of the cathode, all the way to the plastic case 10. The cathode ink was prepared by mixing 10%-80% w/w Pt catalyst (Electrochem hi spec 6000), 10%-40% w/w Nafion (Aldrich 5% Nafion solution), 5%-60% carbon powder such as Black Pearl 2000, XC 72, Shawingan black or various mixtures of these carbon powders and 0%-80% v/v of pore-former such as ethylene carbonate (EC), diethylcarbonate (DEC), propylene carbonate (PC), ethylene glycol (EG) or their mixture. Alternatively, the cathode ink may be made of carbon supported Pt where the Pt content is between 10 to 90 w/w %. All the powders and the solutions were introduced into a ball mill and mixed with a mechanical vibrator for 10-100 min. The ink obtained was applied with a fine brush to the liquid-water leak-proof material supported by a Toray carbon paper as described above. The ink layer was heated to 40-60° C., and 3-4 layers of ink were needed (with 10-20 min. of drying time between each layer) in order to obtain a Pt loading of 4-6 mg/cm$^2$. Alternatively the cathodic catalyst ink was directly applied to the PCM and hot pressed to a 20% teflonated Toray paper with or without a leak-proof layer as described above to form a 10 to 50 micron thick layer.

Devices for Controlling Water Evaporation from a Fuel Cell

In operating a Direct Oxidation Fuel Cell (DOFC) having a water leak-proof cathode, no water loss is experienced and, in fact, in some cases there is an accumulation of water in the anode compartment and/or in the fuel solution. For example when using a methanol fuel cell, each mole of methanol (32 g/mole) is converted into two moles of water (36 g per two moles) and one mole of $CO_2$, which leaves the cell. When using an effective water leak-proof cathode, water dragged into the cathode and water produced in the cathode return to the anode compartment through the membrane, and there is a net gain of water in the anode compartment or in the fuel tank, leaving no room to add fuel, making it impossible to charge the fuel cell with new fuel. In order allow recharging the fuel cell, one must make room in the fuel tank or in the anode compartment by removing some of the water. While some water is usually removed by evaporation from the cathode, in an environment characterized by high humidity or low temperature natural evaporation might become insufficient to afford the necessary room. This may also happen under more usual environmental conditions if the fuel cell is working to produce high power. Therefore, it may be stated that the present invention concerns not merely prevention of water leaking from fuel cell, but even a fuel cell that may be operated under water-balanced conditions, namely, that does not loose nor gains water during operation.

Figure 2:
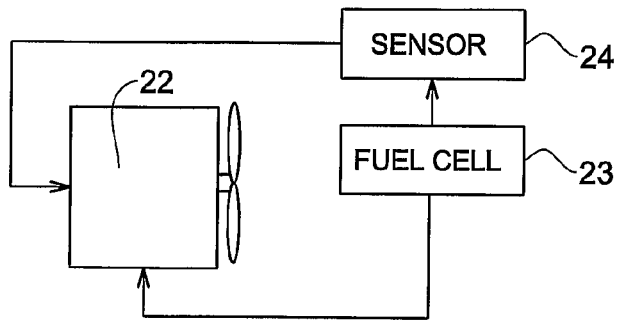
FIG. 2 is a block diagram of an arrangement to promote the evaporation of water from a fuel cell of the type shown in FIG. 1A.

One way to increase the water removal from the fuel cell is to promote evaporation by forcing a stream of air onto the outside of the cathode at a sufficient and controlled rate, in order to remove the excess of water. This may be done, as shown schematically in FIG. 2, by the use of a fan or blower 22, which is powered by fuel cell 23. It is best to combine this fan or blower with a water level sensor 24 located either in the anode compartment or in the fuel solution tank which automatically activates the fan when the water level (or fuel solution level) rises above a predetermined level, and deactivates it when the water or fuel solution level is below another predetermined level.

Another kind of a controller system according to the invention measures the humidity in the air inlet and in the air outlet and calculates the water loss and calculates continuously the water production rate (according to the power of the fuel cell), measures the temperature, calculates the air circulating rate that is sufficient to evaporate the water formed in the DOFC and run the blower at this rate.

For medium and high power applications a state of the art DOFC operates at temperatures of about 60 to over 100° C. with air circulation. Using a condenser, water is collected from the exhaust air stream and recycled back to the water tank. This water condenser and recycling system can be saved or at least reduced in size, at least for medium temperatures and medium power, by using a liquid-water leak-proof cathode according to the invention, in combination with evaporation control as described above.

Devices for Controlling Building of Hydraulic Pressure in a Fuel Cell

Figure 3:
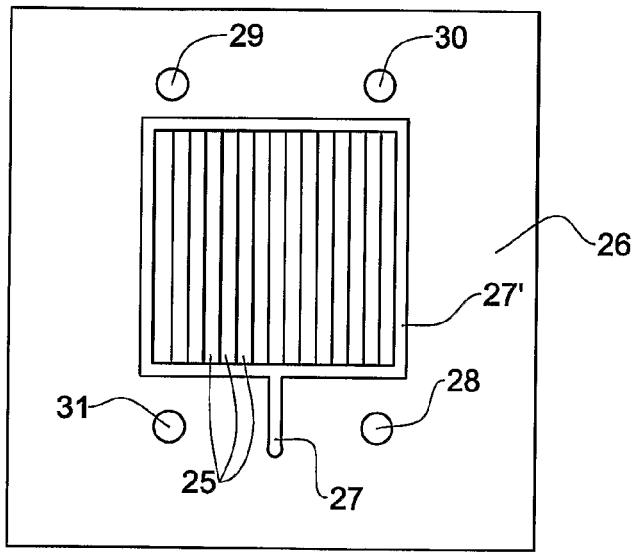
FIG. 3 shows a water-drain system for the fuel cell.

In a fuel cell in accordance with the invention the osmotic drag of water by the protons produced in the anode may cause an unacceptable build-up of hydraulic pressure at the catalyst layer of the cathode. This pressure might cause catalyst flooding at high current densities and discharge of liquid water or aqueous fuel solution through the liquid-water leak-proof layer into the outer side of the cathode. It is desirable therefore, to release the pressure imposed on the cathode in the course of operation. Therefore, a fuel cell of the invention may be equipped with means to prevent hydraulic pressure built-up on the cathode in the course of operation of the cell. As shown in FIG. 3, such means include water collectors 25, capable of collecting water and fuel solution. The water collectors 25 are connected to a drain pipe 27 through a manifold 27'. Drain pipe 27 lets the water out of the cell. Then, the water may be directed to the environment or back into the fuel solution tank, as required, by a separate control and delivery system (not shown).

According to one embodiment of the invention, the water collectors 25 are a set of hydrophilic channels pressed onto the cathode face, where the water is expected to accumulate. According to another embodiment the water collectors 25 are a set of hydrophilic fibers, such as cotton fibers, placed where the water are expected to accumulate. The size of the channels or fibers is typically 0.01 to 0.2 mm in diameter and they are about 0.3 to 3 mm apart.

The precise location wherein water is expected to accumulate depends on the location of the liquid-water leek-proof layer.

In cases where a PCM with liquid acid is used, a thin porous hydrophilic layer, such as carbon or glass may be applied in the location of water accumulation, to serve as liquid water collector rather than the water collectors of FIG. 3.

Figure 4:
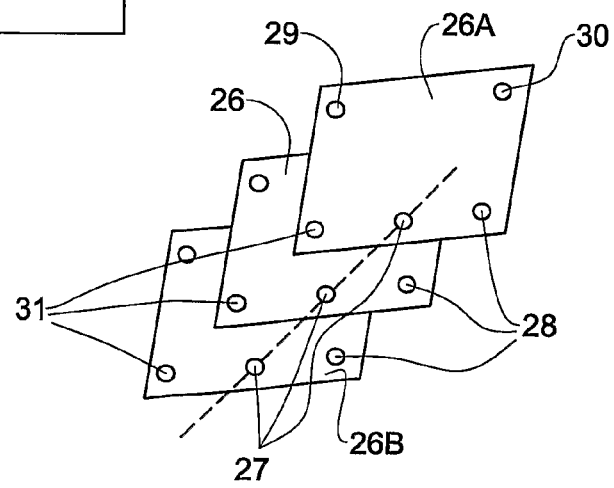
FIG. 4 shows a water drain stack.

FIG. 4 shows a fuel cell according to FIG. 3, ready for stacking in parallel together with other fuel cells with the same configuration. In the fuel cell of FIG. 4 the MEA 26 is sandwiched between front and rear layers 26A and 26B. The stack at its lower right corner has a fuel inlet 28, and at its right corner has an oxygen inlet 30. At its left lower corner, the stack has an oxygen outlet 31 and at its upper left corner a fuel outlet 29. At the bottom of the stack there is the water drain outlet 27. Evaporation rate may be controlled by the rate of air circulation through oxygen inlet 30 and hydraulic pressure may be released through drain outlet 27.

Passive and Active Air Control Systems:

As mentioned above, one source of water loss in a fuel cell in accordance with the invention is water vapor discharged by the cathode by diffusion into the air or the oxygen flow field. In flat cells there is a perforated current collector or a perforated sheet covering the backing layer. The number and size of the holes in this current collector affect both cell power and the rate of water evaporation. The larger the pores and their number, the higher is the rate of water evaporation. Up to a certain size and number of pores, the power of the cell increases. But a further increase in pore size and number do not raise the power but instead increases water loss by evaporation.

The rate of water loss by evaporation increases with temperature and with the airflow rate on the cathode, and with a decrease in air humidity. A "W" factor is herein defined as the ratio between moles of water lost to the air to moles of fuel consumed in the cell reaction. We define an "H" factor as the ratio between moles of water discharged from the cathode to the air to moles of protons transferred from the anode to the cathode through the membrane.

In oxidation of one methanol molecule, two molecules of water are formed and six protons are transferred through the membrane from the anode side to the cathode side. Hence under water-balanced operating conditions W=2, and H=⅓ (or ⅔). This means that the rate of water loss equals the rate of water production in the cell reaction, there being no net loss of water in the cell and no need to add water to the cell. It is therefore important to design a fuel cell with H=⅓ and W=2, in such case only fuel has to be added and there is a saving of weight and volume. However, if W is greater than 2 or H is larger than ⅓, water has to be added to the cell and if W is smaller than 2 or H smaller than ⅓, water is needed to be removed from the fuel cell. For hydrogen, one molecule of water is formed for one molecule of hydrogen consumed (it means that W=1 and H=½ under water-balanced operating conditions) and the consideration is similar so under balanced water operating conditions one mole of water is needed to be removed for each mole of hydrogen being consumed. For other fuels, like ethylene glycol and dimethyl oxalate, H and W have to be calculated according to the cell reaction.

Figure 5:
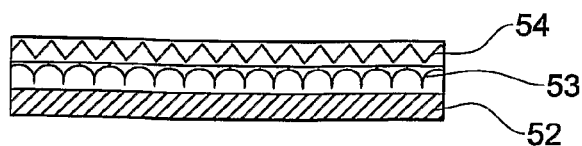
FIG. 5 shows, in section, a cathode structure according to one embodiment of the invention.

By using a leak-proof cathode in accordance with the invention, and static air, it is possible to control water loss by evaporation by controlling the size and the number of the holes in the cathode current collector. Using a leak-proof cathode 52 as shown in FIG. 5, and a passive air and humidity control system comprising a perforated sheet 54 (optional) that covers the perforated cathode current collector 53, it is then possible for a methanol fuel cell operating at room temperature, to reduce W from 8 to less than 1 and H from 1.5 to close to zero, with a negligible effect on cell power. This has been achieved by reducing the hole diameter (of either the cathode current collector layer or the of the perforated sheet) from 5 mm to 1 mm. In a state of the art methanol fuel cell the parameter H was measured to be 2.9 (X. Ren and S. Gottesfield, J. Electrochem. Soc. 148, A87-A90 (2001). This means that in a state of the art methanol fuel cell, 2.9 water molecules have to be added to the cell per each proton that pass the membrane whereas with the fuel cell according to the present invention, no water or a negligible amount of water has to be added. Therefore the state of the art methanol fuel cell contains a large water tank that may be omitted according to the present invention, and is larger and heavier than a methanol cell according to the invention.

Another way of controlling water evaporation is to add to the airside of the cathode, a large porous hydrophilic matrix containing holes for efficient air penetration to the cathode. A porous layer covering the cathode and having 0.5-10 holes per $cm^2$ of cathode with a total pore area of 0.2 to 70 mm square per one square cm have been tested in the present invention. Smaller the total area of the holes, smaller W and H factors were measured.

Another way to control the rate of water loss via evaporation is to provide variable size holes in the cathode current collector or in a special metal or plastic sheet that covers the cathode. This can be done by a set of plates having holes functioning as an air shuttle that slide with respect to each other, one being fixed and the other moveable. The holes openings vary from a maximum open state, which occur when the holes in the plates are superimposed, to a full close.

Figure 6:
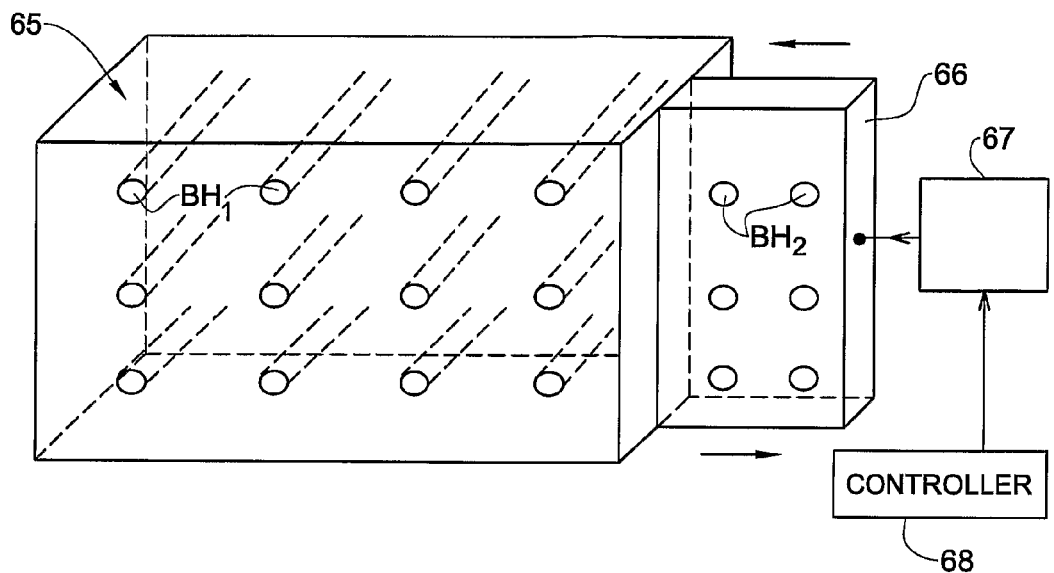
FIG. 6 schematically illustrates a fuel cell with means for controlling the evaporation therefrom, according to one embodiment of the invention.

An active air and humidity control system, as shown in FIG. 6 includes an air shutter which includes a fixed panel 65 having an array of breathing holes $BH_1$ bored therein. Slidable with respect to fixed panel 65 is a movable panel 66 having breathing holes $BH_2$ which is movable from a position in which the breathing holes in the movable panel are in registration with those in the fixed panel to provide maximum air flow, to a position in which the holes in the panels are out of registration to cut off air flow. In practice, the fixed panel may be hollow to form a duct into which the movable panel is telescoped.

The relative positions of the two panels of the air shutter is controlled by a controller. One type of such as a controller consists of a cylinder whose piston is operated by liquid vapor, adjusted to the air temperature, in a manner whereby it is fully open at low temperatures and almost closed at elevated temperatures. Or the shutter may be operated by a micro servo, relay or piezoelectric device 67. This device is activated by a controller 68 governed by a signal coming from sensors in the fuel tank or in the anode compartment (not shown) monitoring the water level. It opens the breathing holes when the water level passes a critical value and it permits a minimal opening level when operating the fuel cell when water is below the predetermined level.

Figure 7:
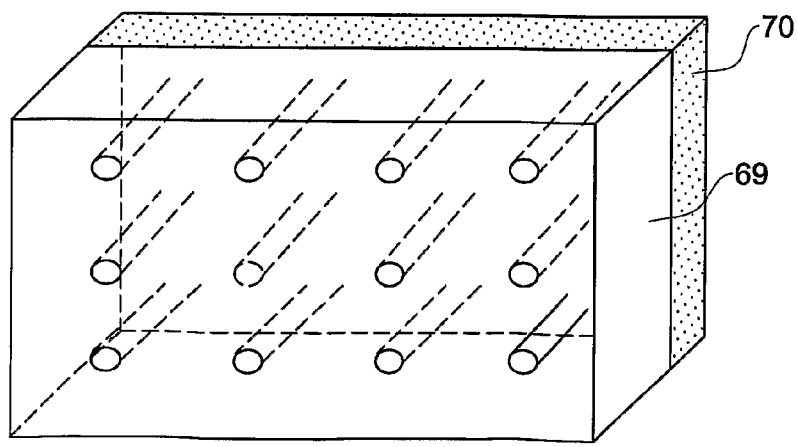
FIG. 7 shows a fuel cell with means for controlling the evaporation therefrom, according to another embodiment of the invention.

In a passive air control device as shown in FIG. 7, the breathing holes are of 0.5 to 5 mm in diameter, and a thin humidity-sensitive porous matrix 70 is placed over the breathing holes sheet 69. Depending on the air humidity, the matrix 70 changes its pores size, i.e. when the air humidity is high the pore size increases to allow vapor to pass through.

Fuel-Vapor Equilibration:

It is desirable in a direct oxidation fuel cell system of the non-stack type in which neighboring cells in the system have a common wall or where their fuel tanks have a common wall, to equilibrate the concentration of the volatile fuel in the system.

The following arrangement can be used for methanol concentration equilibration.

The fuel tanks (or the anode compartment of the cells) are built adjacent to each other with a common wall (tandem or side by side configuration). This common wall, above the level of the liquid has one or more apertures that are preferably covered by a porous hydrophobic nonconductive film.

The film is made of insulating material and is permeable only to fuel and water vapors, but not to the aqueous solution in order to assist in reaching equilibrium of the vapor phase above the liquid.

This acts to equilibrate the concentration of the methanol (or other volatile fuel) in the fuel tanks or in the anode compartments of adjacent cells. Using this concentration equilibration device, it is possible to use a manifold to feed water and fuel into multi cell DOFC system, there being no need to have an individual supply line to each one of the cells.

Liquid Level Detector Utilizing an Electrodes' Arrangement:

When a DOFC is used to power an appliance whose orientation is not fixed, it is desirable to detect the liquid (e.g., water, fuel, fuel solution or acid) level independently of the orientation of the appliance. When using a cell phone or other portable device, its orientation undergoes frequent change, and the phone may be used in all positions including upside down. As previously noted, when the liquid level falls below a certain level, there is then a need to feed the liquid into the anode compartment. Or when it goes higher than a certain level, there is a need to activate a blower. Therefore, there is a need for a liquid level detector, which detects the liquid level, and preferably independent of the liquid container orientation in space. Such a detector is provided by the present invention, and is characterized by having an electrodes' arrangement, preferably including at least four electrodes. The electrodes are arranged in a spaced-apart relationship in the container so as to be in contact with the inside space of the container (tank), such that they are capable of detecting the existence/absence of liquid inside the tank in different planes (levels) in the tank.

Figure 8:
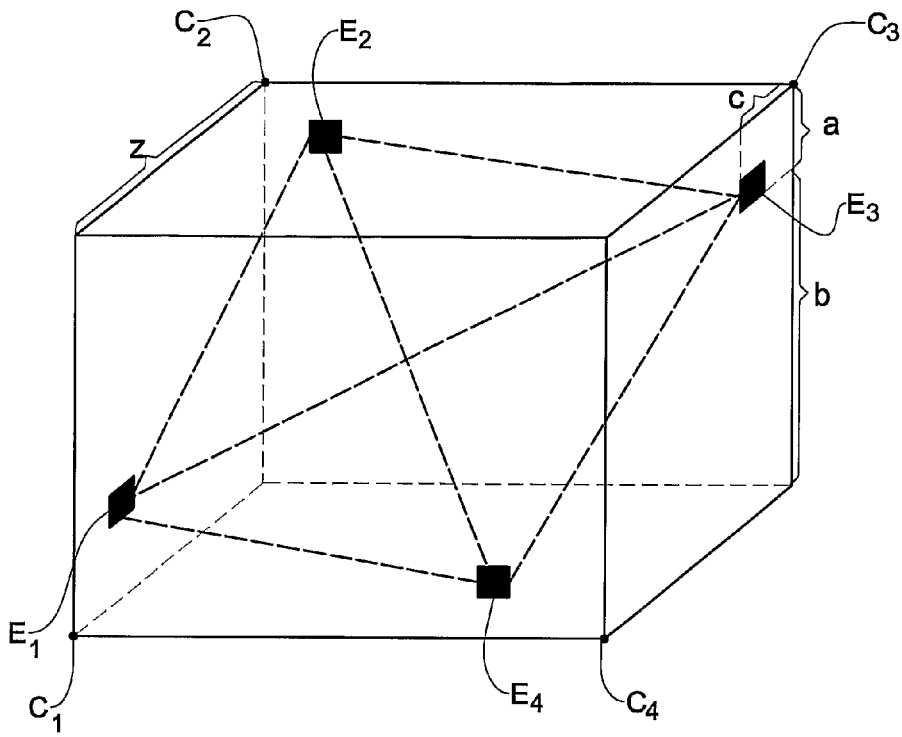
FIG. 8 schematically shows a four-electrode liquid level detector.

As exemplified of FIG. 8, where the liquid containing tank in the form of a six-sided closed structure (box) is used, the electrodes' arrangement includes four electrodes $E_1$-$E_4$ arranged such that each one of the electrodes is located closer to a different corner of the box, and thus six possible voltage differences allow detection of the existence or absence of liquid at six different levels, respectively. Each two electrodes are located on a line inclined to any of the sides of the box. In this specific example, the location of each of the electrodes is defined in the following manner (shown in the figure for one electrode $E_3$ only). The electrode is spaced from the respective corner $C_3$ the distances a and c, wherein the distances a and c are chosen to satisfy the relations that (a/(a+b) varies between 0.1 and 0.4, and c=0.1 to 0.5z, wherein (a+b) and z are the sizes of the respective sides of the box, as shown in the figure. The resistance of a medium at levels defined by each electrodes' pair is measured from time to time or continuously, and when a resistance change (from a certain reference value) at one or more levels is detected, this is indicative of that the liquid level is low. If the liquid level must be kept below a predetermined value, at least one pair of electrodes must show a high resistance defined by a certain preset threshold value.

Reduced Exposure to RF when Using Cell Phone:

Exposure to radiation, whether radiant energy from a radioactive, X-rays or microwave source may have serious consequences. Repeated exposure to such radiation has a cumulative effect and may induce cancer. Of concern, therefore, is a cell phone from whose antenna is radiated microwave energy, the antenna being adjacent the head of the phone user. To minimize the adverse effect of such microwave radiation, the cell phone is powered by a DOFC in accordance with the invention.

By placing the DOFC and its fuel and water tanks on the phone cell side close to the head, this leads to a significant decrease in harmful exposure, for the microwave energy is then at least partly absorbed by the water and fuel in the DOFC.

Example 1

A fuel cell housing was fabricated from synthetic graphite plates (from Globetech Inc.), in which parallel flow field was engraved. The anode was prepared using Pt—Ru ink that was spread over an unteflonated Toray paper. The ink composition was 94.5 wt % Pt—Ru powder (Johnson Matthey), 2.5 wt % XC-72 carbon powder, 1.5% PVDF and 1.5% $SiO_2$. Ethylene glycol was added to 50% in volume. A PCM was hot pressed at 100° C. for 60 sec at 24 kg/$cm^2$, to final thickness of 120 μm, and was immersed in water. The cathode ink was prepared to by mixing 73 wt % of Pt powder, 10% of XC-72 carbon powder and 17% of Nafion solution, with 50-v/v % ethylene glycol in a ball-mill for 65 minutes.

MEA preparation: a 100 μm thick teflon gasket was placed on stainless-steel plate. The anode was immersed in water; the excess water was wiped off and the anode was fixed in a window in the gasket, of the appropriate dimension (20 mm*25 mm). The PCM was placed over the anode (after wiping the excess water of it). Another identical Teflon gasket was placed on the PCM, aligned with the first one, and was fixed to the stainless-steel plate with adhesive tape. The cathodic catalyst ink was applied on the membrane via the gasket window to achieve a thick hydrophobic catalyst layer that can serve as a liquid water blocking layer. A piece of 20 wt % waterproof Toray paper was cut to the window dimension and put over the wet cathodic catalytic layer which was free of holes or cracks larger than 0.5 μm. Alternatively, the cathodic ink was spread over 20% waterproof Toray paper with an embedded liquid-water leak-proof layer (as described before). This leak-proof layer was free of holes or cracks larger than 0.5 μm. A second stainless-steel plate was placed over the second gasket. The assembly was pressed for 120 seconds at 100° C. at pressure 0.5-24 kg/$cm^2$, then the MEA was immersed in water for 60 seconds and pressed again for 120 seconds. The MEA was left to cool to room temperature under low load (<0.5 kg/$cm^2$). A solution of PVDF in acetone was spread on the gap between the Toray paper and the Teflon gasket on the cathodic side of the MEA to prevent liquid water leaks. The MEA was then immersed in water until assembling in the complete cell.

A solution of 1M methanol and 3M sulfuric acid was circulated in the 5 $cm^2$ cell while it was discharged at constant current of 150 mA/$cm^2$. Oxygen was circulated through the cathode. At the oxygen outlet, a U-shaped glass tube containing Dryerite (anhydrous $CaSO_4$) was attached, in order to trap the water emerging out of the cell with the gas stream. The cell was operated at 60° C. or at 80° C. and at ambient pressure to 3 Atm at flow rates from 7 to 240 scc/min. W-factor was defined as the ratio between moles of water exit the cathode outlet (collected at the glass tube) to moles of methanol consumed in the cell reaction. The optimal value of W at water-balanced condition is 2. H is the ratio between moles of water crossing the membrane to moles of protons produced in the anodic reaction—the optimal value at water-balanced conditions being zero. The W and H values (corrected for crossover current) are summarized in the following Table 1:

TABLE 1 the effect of oxygen flow rate on W and H at 60° and 80° C.

| Water flux [gr/$cm^2$ * h] | Electric capacity [Ah] | Oxygen flow rate [scc/min] | Temp [° C.] | W factor | H |
|---|---|---|---|---|---|
| −0.033 | 1.24 | 13 | 60 | 1.00 | −0.33 |
| 0.023 | 0.875 | 32 | | 4.36 | 0.23 |
| 0.116 | 1.5 | 85 | | 9.92 | 1.15 |
| 0.144 | 1.16 | 151 | | 11.6 | 1.43 |
| −0.03 | 0.81244 | 7 | 80 | 1.4 | −0.27 |
| 0.01 | 0.872 | 10 | | 3.6 | 0.098 |
| 0.096 | 0.631 | 25 | | 8.96 | 1 |
| 0.279 | 0.5 | 78 | | 19.6 | 2.77 |
| −0.049 | 0.669 | 15 (3 Atm) | | 0.3 | −0.45 |
| −0.025 | 1.144 | 21 (3 Atm) | | 1.56 | −0.24 |
| 0.0004 | 0.871 | 25 (3 Atm) | | 3.2 | 0.004 |
| 0.044 | 0.84 | 90 (3 Atm) | | 5.80 | 0.47 |
| 0.163 | 0.657 | 240 (3 Atm) | | 12.9 | 1.65 |

*Average of few measurements

It can be seen that W increases with the oxygen flow rate as expected. However, at low flow rates W is lower than 2, i.e. H has a negative value. It means that under these conditions, water flows back from the cathode through the PCM to the anode. It is clear that by controlling the flow rate of oxygen it is possible to affect W and H, so a flow rate where W=2 and H=0 can be found and used to wok under water-balanced conditions. By measuring the water level in the anode compartment or in the fuel tank, a water deficiency or excess is determined and the speed of the air blower (or other means) can be controlled to remove water as necessary. This way the weight and volume of water tank will be saved, leading to a smaller and lighter fuel cell.

Figure 9:
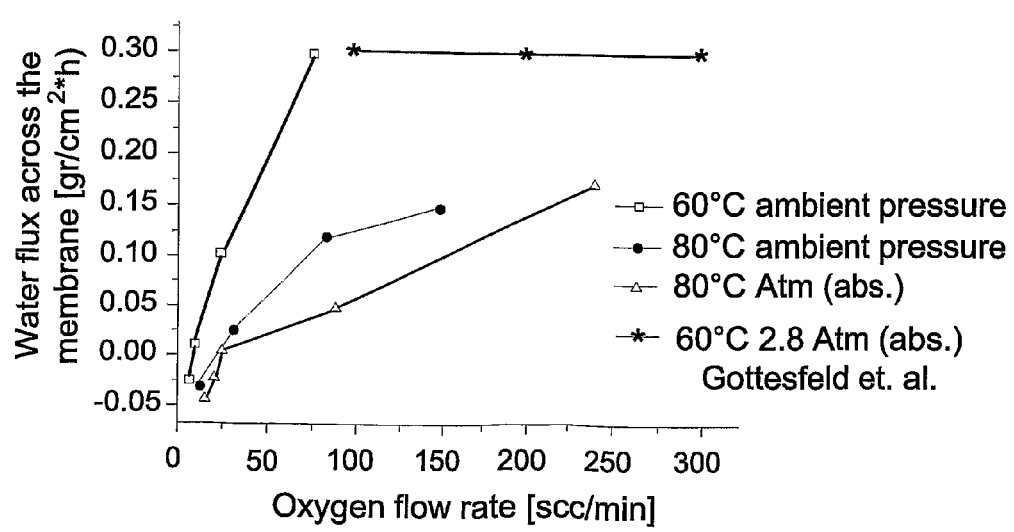
FIG. 9 is a graph that illustrates the dependence of water flux on oxygen flow rate at 150 mA/cm$^2$ according to the invention and in the state of the art.

FIG. 9 presents the experimental results of the fuel cell of the invention in comparison with those of Gottesfeld et al. from Los Alamos National Laboratory (LANL) at similar conditions (Journal of The Electrochemical Society, 148 (1) A87, 2001).

Example 2

A fuel cell was built in the same way as in the previous example on the basis of Nafion membrane. The anode composition was 85% Pt—Ru powder and 15% Nafion. The cathode ink was prepared the same way as in Example 1. The MEA was prepared in the same way as described in the former example and was hot pressed at 130° C.

A 1M methanol solution was circulated through the 5 $cm^2$ cell that was operated at 60° C., pressure of 3 Atm and flow rates from 7 to 240 scc/min. Water was collected at the oxygen outlet (as described) and W-factor and H were calculated. The H values obtained were higher than the values obtained with a PCM-based cell, but lower than those described in FIG. 9 for LANL Nafion-based cell (S. Gottesfeld et al., Journal of The Electrochemical Society, 148 (1) A87, 2001).

The invention claimed is:

1. A cathode suitable for use in a fuel cell having a proton conducting membrane, the cathode comprising a plurality of layers including a catalyst layer and a hydrophobic porous support layer, wherein at least one of the plurality of layers is a liquid-water leak-proof layer (LWLPL) capable of allowing passage of gas and preventing passage of liquid water and/or aqueous fuel solution from the cathode catalyst layer to the airside of the cathode and outside the fuel cell, wherein the fuel cell is a direct oxidation fuel cell fed by water soluble fuels, and wherein the LWLPL is free of cracks or holes larger than 5 microns.

2. The cathode according to claim 1, wherein the liquid-water leak-proof layer is electrically conductive.

3. The cathode according to claim 1, wherein the liquid-water leak-proof layer is a hydrophobic layer having holes or cracks of a size between 0.001 µm and 5 µm.

4. The cathode according to claim 3, wherein the holes or cracks are of a size between 0.01 µm and 0.5 µm.

5. The cathode according to claim 1, wherein the catalyst layer is a liquid-water leak-proof layer.

6. The cathode according to claim 5, wherein the catalyst layer is free of holes or cracks larger than 3 µm.

7. The cathode according to claim 1, wherein one of the plurality of layers is a hydrophobic gas diffusing layer being also a liquid-water leak-proof layer.

8. The cathode according to claim 7, wherein the gas diffusing layer is embedded in the hydrophobic porous support layer.

9. The cathode according to claim 1, wherein the liquid-water leak-proof layer is applied directly on the catalyst layer.

* * * * *